3,226,370
GRANULAR POLYMERIZATION IN AQUEOUS EMULSION OF NORMALLY CRYSTALLINE VINYLIDENE CHLORIDE

Frank M. Poindexter, Breckenridge, Mich., assignor to The Dow Chemical Company, Midland, Mich., a corporation of Delaware
No Drawing. Filed June 25, 1962, Ser. No. 205,108
8 Claims. (Cl. 260—80.5)

This invention relates to a process for effecting polymerization in aqueous emulsion of normally crystalline vinylidene chloride polymers in discrete particulate form.

When a normally crystalline vinylidene chloride polymer is produced in aqueous emulsion by conventional methods, it has often been found difficult to free the polymer, after coagulation, from the electrolyte used to coagulate the emulsion, and from other impurities. The coagulum is often slimy or pasty, and impurities which should be soluble in water are held tenaciously by the coagulum. Such a mass generally cannot be washed free of electrolyte and remaining emulsifier, and when dried for use in molding or extrusion operations, shows evidence of the impurities in the inferior properties of the molded or extruded articles.

It is accordingly, an object of this invention to provide a process for the polymerization of normally crystalline vinylidene chloride polymers in aqueous emulsion to produce an easily recoverable polymeric product in discrete, particulate form without coagulation of such aqueous emulsion.

Other and related objects will become apparent from the following specification and claims.

The above and related objects are attained by a process which comprises emulsion polymerization of the monomeric constituents of a normally crystalline vinylidene chloride polymer in an aqueous medium containing (1) a peroxygetn compound, (2) a ferric salt of an inorganic acid in amount having an iron content corresponding to at least about 0.002, and preferably between 0.002 and 0.08 weight percent of the combined weight of the polymerizable material, (3) a mineral acid in amount sufficient to give the polymerization mixture a pH value between about 1 and 3, and (4) a dialkyl ester of sodium sulfosuccinic acid wherein each alkyl group contains from 4 to 8 carbon atoms, in amounts sufficient to uniformly disperse the polymerization mixture.

The normally crystalline vinylidene chloride polymers usable in this invention are well known in the art. Typical of materials falling within the advantageous definition are the polymers and interpolymers of at least about 70 weight percent of vinylidene chloride with the remainder composed of one or more other mono-ethylenically unsaturated comonomers. Representative of such polymers are those composed of at least 70 weight percent of vinylidene chloride with the remainder made up of vinyl chloride, acrylonitrile, and acrylic acid or its ester derivatives including methyl acrylate, ethyl acrylate, methyl methacrylate, and the like, and suitable mixtures thereof.

The catalysts employed in the present process consist essentially of a mineral acid, a peroxygen compound which is capable of supplying nascent oxygen to the polymerization mixture, and a ferric salt of an inorganic acid. The kinds and relative proportions of acid, and peroxygen compound, may be varied quite widely. There are definite limits however as to the proportions of ferric salt which should be employed in order to obtain a strong catalytic effect and, additionally, a normally crystalline vinylidene chloride polymer in discrete particulate form as described herein.

Any acid capable of rendering the reaction mixture sufficiently acidic, e.g. a mineral acid such as nitric acid, hydrochloric acid, etc., may be employed. In most instances nitric acid is preferred, since it appears to be somewhat more effective than the other acids. It is important that the acid be present in amount sufficient to give the polymerization mixture a pH value of less than about 3, since the activity of the catalyst decreases sharply with a pH value of greater than about 3. The acid is preferably used in amount sufficient to give the reaction mixture a pH between 1.5 and 3.

As the peroxygen ingredient of the catalyst, hydrogen peroxide is preferred, however, other peroxygen compounds such as benzoyl peroxide, sodium perborate, peracetic acid, or metal peroxides sush as barium, or sodium peroxide which will react with the acid to form hydrogen peroxide in situ may be used. Between 0.002 and 0.2 mole of peroxide is usually employed per mole of the polymerizable materials, but the peroxide may be used in smaller or considerably larger proportions if desired. The presense of a large excess of a peroxygen compound over the amount necessary to obtain the catalytic effect is generally not detrimental to the present process.

Any ionizable iron salt of an inorganic acid may be used as an ingredient of the catalyst system. The iron salt may be added as such or be formed in situ within the polymerization mixture, e.g. by adding the iron as ferric oxide and reacting the latter with a portion of the acid added as a catalyst ingredient. Examples of suitable ferric salts are ferric nitrate, ferric chloride, ferric bromide, etc. The ferric salt is employed in amount such that its iron content corresponds to at least 0.002 and preferably between 0.002 and 0.08 percent of the combined weight of the polymerizable materials. An iron content of less than about 0.002 weight percent produces the normally crystalline vinylidene chloride polymer in latex form, and iron contents in excess of about 0.08 weight percent often form large non-filterable polymeric agglomerates, and may adversely affect the properties of the so-formed polymer.

The emulsion is prepared by mixing the polymerizable materials and the catalyst ingredients with an aqueous solution of an emusifying agent and ag:tating the mixture until it is emulsified. The identity of the emulsifying agent is of utmost importance for the purposes of the present invention as the preparation of normally crystalline vinylidene chloride polymers in discrete particulate form occurs only when such emulsifier is a dialkyl ester of sodium sulfosuccinic acid, particularly those dialkyl esters of sodium sulfosuccinic acid wherein each of the alkyl groups contain from 4 to 8 carbon atoms. As purely exemplary of such emulsifiers are; the dibutyl ester of sodium sulfosuccinic acid, the dihexyl ester of sodium sulfosuccinic acid, and the dioctyl ester of sodium sulfosuccinic acid, and the like. An emulsifier content of at least about 1.5 weight percent based on the combined weight of the polymerizable materials is preferred, however, any amount of emulsifier as described herein which is sufficient to uniformly disperse the polymerization mixture is applicable for the purposes of the present invention.

After completion of the polymerization in emulsion, as described herein, the so-formed normally crystalline vinylidene chloride polymer separates from the aqueous medium in discrete particulate form and may be recovered by any suitable means as filtering or centrifuging of the polymeric aqueous dispersion.

The following example, wherein all parts and percentages are to be taken by weight, illustrates the present invention but is not to be construed as limiting its scope.

Example 1

There was charged into a glass-lined kettle:

| | Pounds |
|---|---|
| Pure water | 90 |
| Monomeric vinylidene chloride | 38.7 |
| Monomeric methyl methacrylate | 3.15 |
| Monomeric methyl acrylate | 3.15 |
| Hydrogen peroxide | 0.45 |
| Dihexyl sulfosuccinic acid, sod. salt | 0.75 |
| Fe(NO$_3$)$_3$–10% solution | 0.66 |

The mixture was agitated, to form an emulsion, and amounts of concentrated nitric acid sufficient to provide a pH of 2, added. The mixture was heated at 55° C. for nearly three hours, by which time a polymer of discrete, particulate form separated from the emulsion. Remaining monomeric materials were vented, the mixture cooled to 30° C., and the aqueous, polymer containing mixture centrifuged to recover a granular normally crystalline vinylidene chloride polymer. The yield of such polymer representing about a 99 percent conversion of the corresponding monomeric starting materials.

Compression molded specimens produced from the resulting polymer are transparent and nearly colorless.

Similar good results are obtained wherein the monomeric constituents of any normally crystalline vinylidene chloride polymer are polymerized in an aqueous medium containing (1) a peroxygen compound, (2) the expressed amounts of a ferric salt of an inorganic acid as described herein, (3) the expressed amounts of a mineral acid as described herein and (4) any dialkyl ester of sodium sulfosuccinic acid wherein each alkyl group contains from 4 to 8 carbon atoms, in amounts sufficient to uniformly disperse the polymerization mixture.

By way of contrast, in each of a series of experiments there was charged into a glass-lined kettle a mixture of the composition described in Example 1, wherein the dialkyl ester of sodium sulfosuccinic acid emulsifier was replaced by equal amounts of one of a series of commercially accepted emulsifiers, including: Triton X-100, an alkyl aryl polyether alcohol, manufactured by the Rohm & Haas Co.; sodium lauryl sulfonate and Ultrawet D.S., an akyl benzene sodium sulfonate manufactured by the Atlantic Refining Company. Each of such mixtures was then caused to emulsion polymerize as described in Example 1, with resultant formation of a latex material in all instances.

Thus, as illustrated by the above results, the advantageous formation of a normally crystalline vinylidene chloride polymer in discrete particulate form by emulsion polymerization, wherein the difficult and costly coagulation step is rendered unnecessary for recovery of such polymer, is achieved only by strict adherence to the process as described by the present invention.

What is claimed is:

1. A process for production of normally crystalline vinylidene chloride polymer in discrete particulate form which comprises free radical polymerization of a polymerizable material containing at least about 70 weight percent of vinylidene chloride with any remainder being selected from the group consisting of vinyl chloride, acrylonitrile, acrylic acid, methyl acrylate, ethyl acrylate, methyl methacrylate and mixtures thereof in an aqueous emulsion containing (1) a peroxygen compound, (2) a ferric salt of an inorganic acid in amount having an iron content corresponding to at least about 0.002 weight percent of the combined weight of the polymerizable material, (3) a mineral acid in amount sufficient to give the polymerization mixture a pH value between about 1.5 and 3, and (4) a dialkyl ester of sodium sulfosuccinic acid wherein each alkyl group contains from 4 to 8 carbon atoms, in amounts of at least about 1.5 weight percent based on the combined weight of the polymerizable mixture.

2. The process of claim 1, wherein said normally crystalline vinylidene chloride polymer is a terpolymer formed from a monomer mixture composed of (1) vinylidene chloride, (2) methyl methacrylate, and (3) methyl acrylate.

3. The process of claim 2, wherein said terpolymer is formed from a monomer mixture composed of (1) 86 weight percent vinylidene chloride, (2) 7 weight percent methyl methacrylate, and (3) 7 weight percent methyl acrylate.

4. The process of claim 1, wherein said peroxygen compound is hydrogen peroxide.

5. The process of claim 1, wherein said ferric salt of an inorganic acid is ferric nitrate.

6. The process of claim 5, wherein said ferric nitrate is present in an amount sufficient to provide an iron content corresponding to between about 0.002 and 0.08 weight percent of the combined weight of the polymerizable material.

7. The process of claim 1, wherein said mineral acid is nitric acid.

8. The process of claim 1, wherein said dialkyl ester of sodium sulfosuccinic acid is the dihexyl ester of sodium sulfosuccinic acid.

References Cited by the Examiner

UNITED STATES PATENTS

| 2,563,079 | 8/1951 | Smith | 260—80.5 |
| 2,787,604 | 4/1957 | Miller | 260—80.5 X |
| 3,058,962 | 10/1962 | Trofimow | 260—80.5 X |

JOSEPH L. SCHOFER, *Primary Examiner.*

J. R. LIBERMAN, *Examiner.*